United States Patent
Xu et al.

(10) Patent No.: US 11,321,179 B1
(45) Date of Patent: May 3, 2022

(54) POWERING-DOWN OR REBOOTING A DEVICE IN A SYSTEM FABRIC

(71) Applicant: Amazon Technologies, Inc., Seattle, WA (US)

(72) Inventors: Kun Xu, Austin, TX (US); Thomas A. Volpe, Austin, TX (US); Ron Diamant, Santa Clara, CA (US); Mark Anthony Banse, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 17/001,145

(22) Filed: Aug. 24, 2020

Related U.S. Application Data

(63) Continuation of application No. 16/219,489, filed on Dec. 13, 2018, now Pat. No. 10,761,939.

(51) Int. Cl.
*G06F 11/14* (2006.01)
*G06F 11/07* (2006.01)
*G06F 13/40* (2006.01)

(52) U.S. Cl.
CPC ........ *G06F 11/1441* (2013.01); *G06F 11/073* (2013.01); *G06F 11/141* (2013.01); *G06F 11/1474* (2013.01); *G06F 13/4022* (2013.01); *G06F 2201/87* (2013.01); *G06F 2201/88* (2013.01)

(58) Field of Classification Search
CPC .. G06F 11/1441; G06F 11/073; G06F 11/141; G06F 11/1474; G06F 13/4022
See application file for complete search history.

(56) References Cited

U.S. PATENT DOCUMENTS

| | | | |
|---|---|---|---|
| 5,796,934 A * | 8/1998 | Bhanot | G06F 11/1474 714/15 |
| 5,822,512 A | 10/1998 | Goodrum et al. | |
| 6,247,082 B1 * | 6/2001 | Lo | G06F 13/405 710/105 |
| 7,937,447 B1 * | 5/2011 | Cohen | H04L 41/04 709/212 |
| 8,744,602 B2 * | 6/2014 | Saund | H04L 49/10 700/11 |
| 8,861,386 B2 * | 10/2014 | Saund | H04L 49/50 370/252 |
| 10,509,758 B1 | 12/2019 | Habusha et al. | |
| 2002/0112104 A1 | 8/2002 | Porterfield | |

(Continued)

OTHER PUBLICATIONS

U.S. Appl. No. 16/219,489, "Notice of Allowance",—dated May 4, 2020, 12 pages.

*Primary Examiner* — Matthew M Kim
*Assistant Examiner* — Indranil Chowdhury
(74) *Attorney, Agent, or Firm* — Kilpatrick Townsend & Stockton LLP

(57) ABSTRACT

A circuit at an interface between a device and an interconnect fabric is configured to track outstanding transactions associated with the device and ensure the completion of the outstanding transactions before rebooting or powering down the device. In some embodiments, the circuit is also configurable to provide appropriate responses when the device is powered down or is being rebooted such that other devices in the system can still operate even without knowing that the device is inactive and would not hang because no response is received from the device.

19 Claims, 9 Drawing Sheets

(56) References Cited

U.S. PATENT DOCUMENTS

| | | | |
|---|---|---|---|
| 2014/0112339 A1* | 4/2014 | Safranek | G06F 11/1004 370/389 |
| 2014/0215112 A1* | 7/2014 | Iyer | G06F 13/4282 710/106 |
| 2014/0351484 A1 | 11/2014 | Freking et al. | |
| 2016/0188500 A1* | 6/2016 | Morris | G06F 13/1673 711/154 |
| 2016/0283303 A1* | 9/2016 | Sharma | G06F 11/0727 |
| 2017/0220499 A1 | 8/2017 | Gray | |
| 2018/0241698 A1* | 8/2018 | Zhao | H04L 45/38 |
| 2019/0042510 A1* | 2/2019 | Ngau | G06F 13/4027 |
| 2019/0251055 A1* | 8/2019 | Chen | G06F 1/329 |
| 2020/0081858 A1* | 3/2020 | Philmore | G06F 13/4022 |
| 2021/0240655 A1* | 8/2021 | Das Sharma | G06F 13/4221 |

* cited by examiner

US 11,321,179 B1

POWERING-DOWN OR REBOOTING A DEVICE IN A SYSTEM FABRIC

CROSS-REFERENCE TO RELATED APPLICATIONS

This application is a continuation of U.S. application Ser. No. 16/219,489, filed Dec. 13, 2018, titled "Powering-Down or Rebooting a Device in a System Fabric", issuing on Sep. 1, 2020 as U.S. Pat. No. 10,761,939, which is incorporated herein by reference in their entirety for all purposes.

BACKGROUND

A semiconductor chip, such as a system-on-chip (SOC), may include a fabric (e.g., Advanced eXtensible Interface (AXI) or Advanced Peripheral Bus (APB) based fabric) connecting multiple devices on the chip. There are cases where a device needs to be powered down or rebooted while other circuits or devices of the chip are still active. Because other circuits in the chip are still active, they may still try to perform transactions involving the device that is being powered down or rebooted or that has been powered down. It is desirable to properly handle these transactions in compliance with certain requirements of the fabric.

BRIEF DESCRIPTION OF THE DRAWINGS

Various embodiments in accordance with the present disclosure will be described with reference to the drawings, in which.

DETAILED DESCRIPTION

Figure 1:
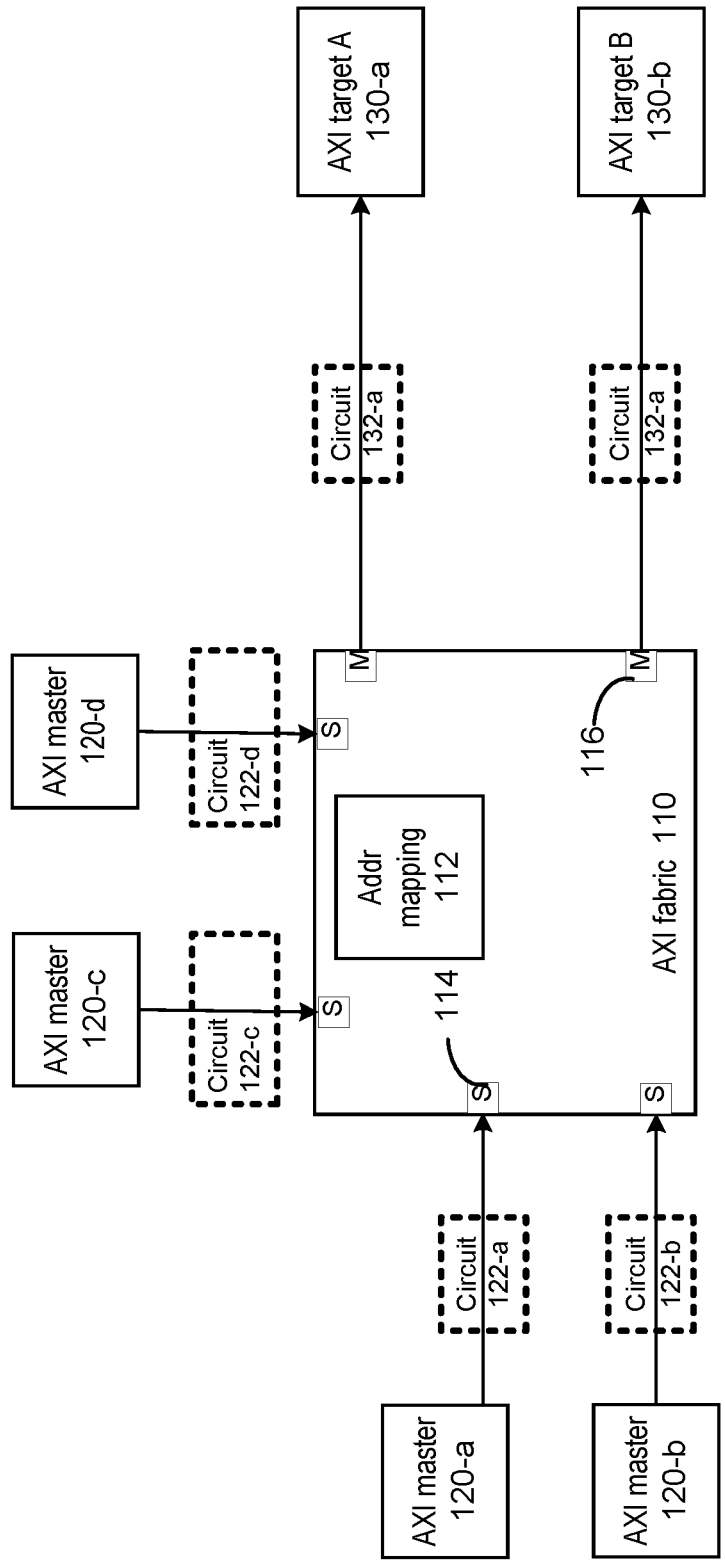
FIG. 1 illustrates an example of a system including multiple AXI master devices and multiple AXI target devices connected through an AXI fabric according to certain embodiments.

Techniques disclosed herein relate generally to a system including multiple devices communicating through an interconnect fabric using, for example, the Advanced eXtensible Interface (AXI) or Advanced Peripheral Bus (APB). According to one embodiment, a circuit may be added at the interface between each device and the interconnect fabric to track outstanding transactions involving the device, and ensure the completion of the outstanding transactions before rebooting or powering down the device. The circuit may also provide appropriate responses when the device is powered down or is being rebooted such that the rest of the system can still operate even without knowing that the device is inactive and would not hang because no response is received from the device.

According to certain embodiments, a circuit that includes a tracking logic and a response generation logic may be added between an interconnect fabric (e.g., AXI or APB interconnect fabric) and a target device (also referred to as a slave device or a servant device). When the target device is active, the circuit may transfer signals between the target device and the interconnect fabric such that the interconnect fabric and the target device may communicate as if the circuit was not added. The transaction identifier (ID) ordering can be achieved by gating the appropriate ready signals (or other back-pressure signals) and tracking outstanding transactions using the circuit when a reboot or power-down request is received, such that the outstanding transactions can be performed before the reboot or power-down and no new transactions may be accepted before the outstanding transactions are completed. In some embodiments, a counter may be used to count the difference between the number of outstanding write address transactions and the number of outstanding write data transactions, such that the ready signals on appropriate channels may be gated at different times to ensure all outstanding transactions associated with any write address transactions and any write data transactions received before the request to reboot or power-down the target device is received are completed before rebooting or powering down the target device. After all outstanding transactions have been completed, the gating on the ready signals may be released and the response generation logic of the circuit may start to generate responses (e.g., error messages) to new incoming transactions such that the source devices (e.g., master devices) may not enter a hang state in which the source devices keep waiting for responses from the target device and no further operations can be carried out by the source devices. In this way, the rest of the system may not need to know that the target device is inactive, and the target device may not need to be changed in order to handle the power down or reboot.

In some embodiments, a circuit may be added between the interconnect fabric and a master device. When the master device is active, the circuit may transfer signals between the master device and the interconnect fabric such that the interconnect fabric and the master device may communicate as if the circuit was not added. When a request to reboot or power-down the master device is received, the circuit may gate the appropriate ready signals (or other back-pressure signals) to the master device and track outstanding transactions associated with the master device, such that the outstanding transactions can be performed before the reboot or power-down and no new transactions may be initiated before the outstanding transactions are completed. In some embodiments, a counter may be used to count the difference between the number of outstanding write address transactions and the number of outstanding write data transactions, such that the ready signals on different channels may be gated at different times to ensure that transactions associated with any write address transactions and any write data transactions sent before the request to reboot or power-down the master device is received are completed before rebooting or powering down the master device. After all outstanding transactions have been completed, the master device may be powered down or rebooted and may not initiate new transactions.

In this way, the devices in the system may be individually powered down or rebooted, and other devices in the system may not need to be aware that a device is inactive. Since the power-down is performed and the responses to the new transactions are generated after all outstanding transactions have been completed, the response ordering is preserved without using a complicate ordering queue logic. No additional handshake logic is needed between the master and the target either. Thus, the chip area and the design complexity of the system can be reduced. In some circumstances, the additional logic is only added at the target port, and the total added circuits may be reduced in a system where there are more master devices than target devices, compared with implementations where the additional logic is added at each master device. In addition, because the additional logic is added after the address mapping logic, no additional routing for the address mapping information may be needed on the top level, thus avoiding or reducing possible routing congestion. Furthermore, the additional circuits can be designed and implemented as stand-alone standard circuits or devices, and can be added between the interconnect fabric and each master or target device without the need to modify any master or target device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. For example, devices, systems, structures, assemblies, methods, and other components may be shown as components in block diagram form in order not to obscure the examples in unnecessary detail. Furthermore, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

FIG. 1 illustrates an example of a system 100 including multiple AXI master devices and multiple AXI target devices connected through an AXI fabric according to certain embodiments. Advanced eXtensible Interface (AXI) is an interconnect that is designed for high performance systems. The AXI protocol is based on a point-to-point interconnect to avoid bus sharing and therefore allow higher bandwidth and lower latency. AXI is one of the most popular ARM Advanced Microcontroller Bus Architecture (AMBA) interface interconnect. The AXI protocol allows different functional blocks within a chip to communicate with each other. The AXI protocol includes, before transmission of any control signal, address, or data, a handshake between a master device and a target device via ready and valid signals. The transmission of control signals or addresses may be separate from the transmission of data both in time and in the communication channel used. A burst type of communication after the handshake allows for the continuous transfer of data. In general, an interconnection fabric is used for the interconnects between more than one master device and/or more than one target device.

System 100 may include multiple AXI master devices 120-$a$, 120-$b$, 120-$c$, 120-$d$, and the like (collectively referred to as "AXI master devices 120"). System 100 may also include multiple AXI target devices 130-$a$, 130-$b$, and the like (collectively referred to as "AXI target devices 130") connected to AXI master devices 120 through an AXI fabric 110. The communication between an AXI master device 120 and an AXI target device 130 is established through an AXI interface that includes five separate channels, including a read address (AR) channel, a read data (R) channel, a write address (AW) channel, a write data (W) channel, and a write response (B) channel. Each channel may have a bus width greater than one, such as 32 or more for 32-bit addresses. Each channel can have its own unique signals and some similar signals. For example, the valid and ready signals may be on each channel to allow for the handshake for each channel. To transmit a signal (e.g., address, data, or response) on a channel between a source device (e.g., a master device) and a target device (e.g., a target device), the source device may provide an active valid signal and the target device may provide an active ready signal. After both the valid signal and the ready signal are active, transmissions may occur on the channel. The transmissions of control signals, addresses, and data are generally done in separate phases. For write operations, the write response (B) channel is used at the completion of the data transfer.

A master device may use AXI transaction identifiers (AXI IDs) to identify separate transactions to be performed in order. All transactions with a same AXI ID value are to be performed in order, but transactions with different ID values do not need to be performed in order. AXI IDs allow a single physical port to support out-of-order transactions by acting as a number of logical ports, each of which handling its own transactions in order. As such, by using AXI IDs, a master can issue new transactions without waiting for earlier transactions to complete. This can improve system performance as it enables parallel processing of transactions.

AXI fabric 110 may be used when the system includes more than one master device and/or more than one target device. The AXI interconnect fabric may be configured to connect a master device to an appropriate target device by decoding and switching, and to ensure that transactions between different master devices and target devices do not interfere with each other. For example, AXI fabric 110 may include multiple target interfaces 114 for point-to-point connection with AXI master devices 120, multiple master interfaces 116 for point-to-point connection with AXI target devices 130, and a crossbar connecting master interfaces 116 and target interfaces 114. AXI fabric 110 may include an address mapping logic 112 configured to determine which master interface 116 is the target of each transaction by decoding the address of each AW or AR channel transaction from target interfaces 114.

In some circumstances, in chips or systems with multiple master devices and/or multiple target devices, a device may need to be powered down or rebooted for various reasons, such as upgrading hardware or software, replacement, or reducing power consumption. The power-down may include, for example, disconnecting the device from a power supply or gating a clock signal to the device. However, it may be desirable to keep other devices in the chip or system active for data processing, rather than powering down or rebooting the whole chip or system. According to certain embodiments, circuits 132-a, 132-b, and the like may be added to AXI target devices 130 or may be inserted between AXI target devices 130 and AXI fabric 110 to handle the power down or rebooting of AXI target devices 130. In some embodiments, circuits 122-a, 122-b, 122-c, 122-d, and the like may be added to AXI master devices 120 or may be inserted between AXI master devices 120 and AXI fabric 110 to handle the power-down or rebooting of AXI master devices 120 or AXI target devices 130.

For example, according to the ordering rule in the AXI protocol, in order to keep other devices active while powering down or rebooting a target device, each master device may be configured to track its own outstanding transactions to the target device and report back to the target device after all the outstanding transactions are completed, such that the target device can start the power-down or reboot process. The master device may also need to generate responses (e.g., error messages) to its own new transactions or stop generating new transactions until the target device sends handshake request indicating that the target device is active again.

Such a solution may need some outstanding transaction tracking logic and complicated handshake logic implemented in each master device that may interact with the target device to be powered down or rebooted. In addition, each master may need to implement the address mapping logic. In an SOC where there are more master devices than target devices, implementing the outstanding transaction tracking logic, handshake logic, and address mapping logic in each master device would use a large silicon area and could be very expensive.

In addition, such a solution may also need routing of address mapping information to each master device, which may use many top level routing wires. For example, in a system with 32 master devices and 8 target devices, 8 address mapping windows (each corresponding to an address range in a target device) may need to be routed to each master device. In an example where each address mapping window is represented by a 64-bit starting address and a 64-bit end address, a total of (64+64)×32×8=32768 routing wires may need to be routed on the top level, which may use a large chip area and make the routing very difficult.

Figure 2:
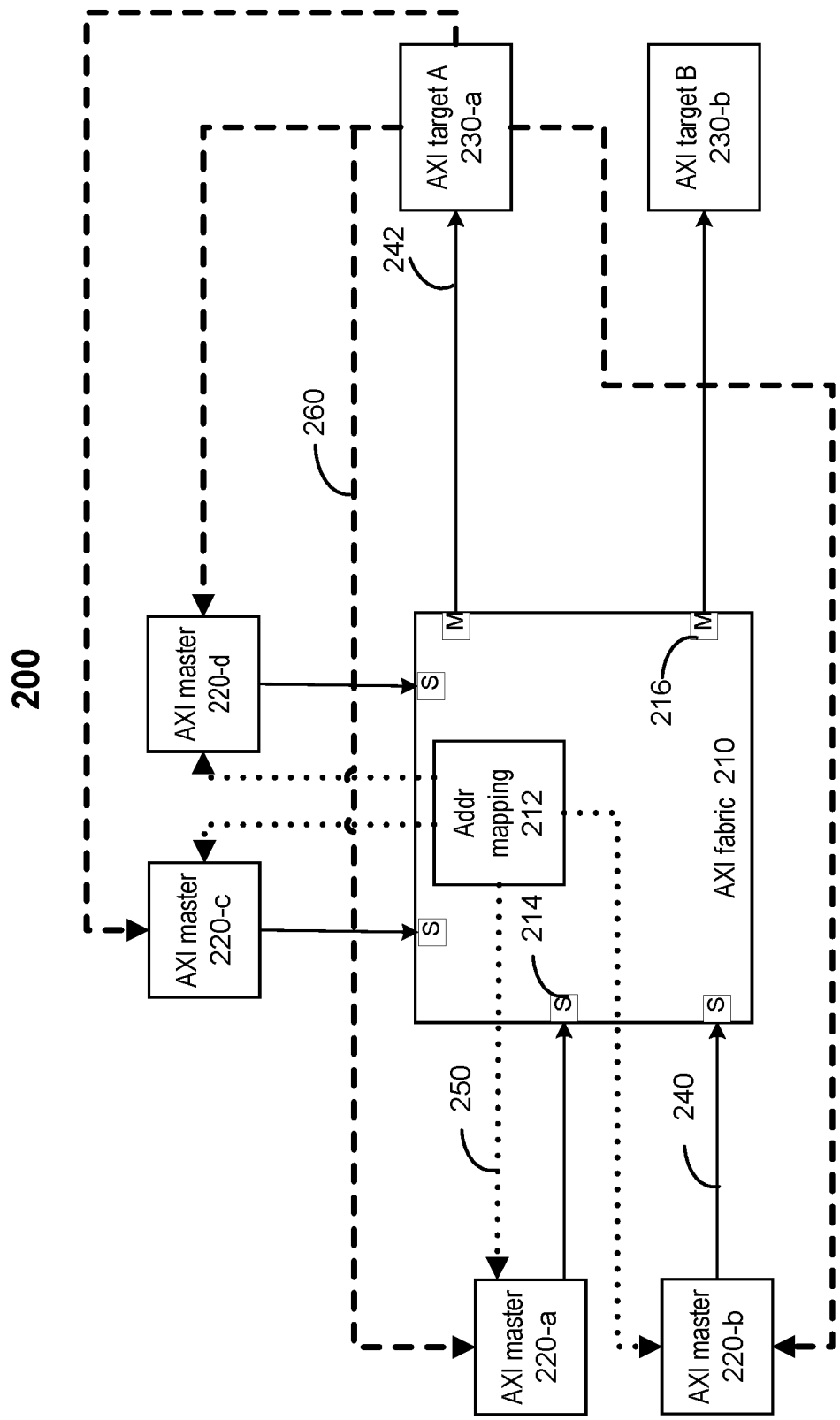
FIG. 2 illustrates an example of routing address mapping information and handshake signals in an example of a system including multiple AXI master devices and multiple AXI target devices according to certain embodiments.

FIG. 2 illustrates an example of routing address mapping information and handshake signals in an example of a system 200 including multiple AXI master devices and multiple AXI target devices according to certain embodiments. System 200 may include multiple AXI master devices 220-a, 220-b, 220-c, 220-d, and the like (collectively referred to as "AXI master devices 220"). System 200 may also include multiple AXI target devices 230-a, 230-b, and the like (collectively referred to as "AXI target devices 230") connected to AXI master devices 220 through an AXI fabric 210. As described above, AXI fabric 210 may be configured to connect each AXI master device 220 to each AXI target device 230 by decoding and switching. For example, AXI fabric 210 may include multiple target interfaces 214 for point-to-point connection (indicated by solid lines 240) with AXI master devices 220, multiple master interfaces 216 for point-to-point connection (indicated by solid lines 240) with AXI target devices 230, and a crossbar connecting master interfaces 216 and target interfaces 214. AXI fabric 210 may include an address mapping logic 212 configured to determine which master interface 216 is the target of each transaction by decoding the address of each AW or AR channel transaction from target interfaces 214.

In some circumstances, an AXI target device, such as AXI target A (230-a), may need to be powered down or rebooted. As described above, in order to comply with the AXI ordering rules and to avoid causing the master devices to hang, in the example shown in FIG. 2, 4 sets of tracking logic and error generation logic may need to be implemented at the four master devices, one at each master device. There may also be many additional top level routing wires as shown in FIG. 2. For example, address mapping routing wires (as shown by dotted lines 250) may be needed between each AXI master device 220 and address mapping logic 212. In addition, master-target handshake signals (as shown by dash lines 260) may be needed between each AXI master device 220 and AXI target A (230-a). Each of dotted lines 250 may include multiple channels, multiple buses, and multiple wires. Each of dash lines 260 may also include multiple routing wires. Thus, four sets of tracking logic and error generation logic and many routing wires may need to be added to system 200 in order to handle the reboot or power-down of a target device while keeping other devices in system 200 active.

Alternatively, the above-described additional logic, such as the outstanding transaction tracking logic, may be implemented between the AXI interconnect fabric and the target device (referred to as the "target port"). As described above, according to the AXI ordering rules, all transactions with the same AXI ID are to be performed in order. Therefore, new transactions may not be performed until all outstanding transactions with the same AXI ID have been completed. One solution may use a transaction ordering queue to remember the order of the transactions with each individual AXI ID, and to generate responses (e.g., error messages) to new transactions according to their order in the ordering queue. Implementing the transaction tracking and ordering logic at the master device may not increase the complexity of the master device too much because most master devices may already have outstanding transaction queues to track the ordering of the transactions and a master device may also choose not to generate new transactions when the target device (e.g., a slave device or a servant device) is being powered down or rebooted. However, implementing the transaction tracking and ordering logic (e.g., ordering queues) at the target port may significantly increase the design complexity and the overall silicon area, in order to comply with the AXI ID ordering rules and to support independent write address (AW) and write data (WDATA or W) ordering on the target device.

According to certain embodiments, a circuit may be added at the interface between the AXI interconnect fabric and a target or master device. When the target or master device is active, the circuit may transfer signals between the device and the interconnect fabric such that the interconnect fabric and the device may communicate if the circuit was not added. The AXI ID ordering can be achieved by gating the appropriate ready signals when a reboot or power-down request is received, such that outstanding transactions can be performed before the reboot or power-down and no new transactions may be accepted or initiated before the outstanding transactions are completed. After all outstanding transactions have been completed, the gating on the ready signals may be released. In some embodiments, the circuit added at the interface between a target device and the interconnect fabric may include a response generation logic. After all outstanding transactions have been completed, the response generation logic may start to generate responses (e.g., error messages) to new transactions such that the source devices (e.g., master devices) may not enter a hang state in which the source devices keep waiting for responses from the target device and no further operations can be carried out by the source devices.

Since the responses to the new transactions are generated after all outstanding transactions have been completed, the response ordering can be preserved without using a complicated ordering queue logic. No additional handshake logic is needed between the master and the target either. Thus, the chip area and the design complexity of the system can be significantly reduced. In some cases, the additional logic is only added at the target port, the total added circuits may be reduced in a system where there are more master devices than target devices, compared with implementations where the additional logic is added in each master device. In addition, because the additional logic is after the address mapping logic, no additional routing for the address mapping information may be needed on the top level, thus avoiding or reducing possible routing congestion. The devices in the system can be individually powered down or rebooted and other devices in the system may not need to be aware that a device is inactive. The circuits can be designed and implemented as stand-alone standard circuits or devices, and can be added between the interconnect fabric and each master or target device without the need to modify any master or target device.

Figure 3:
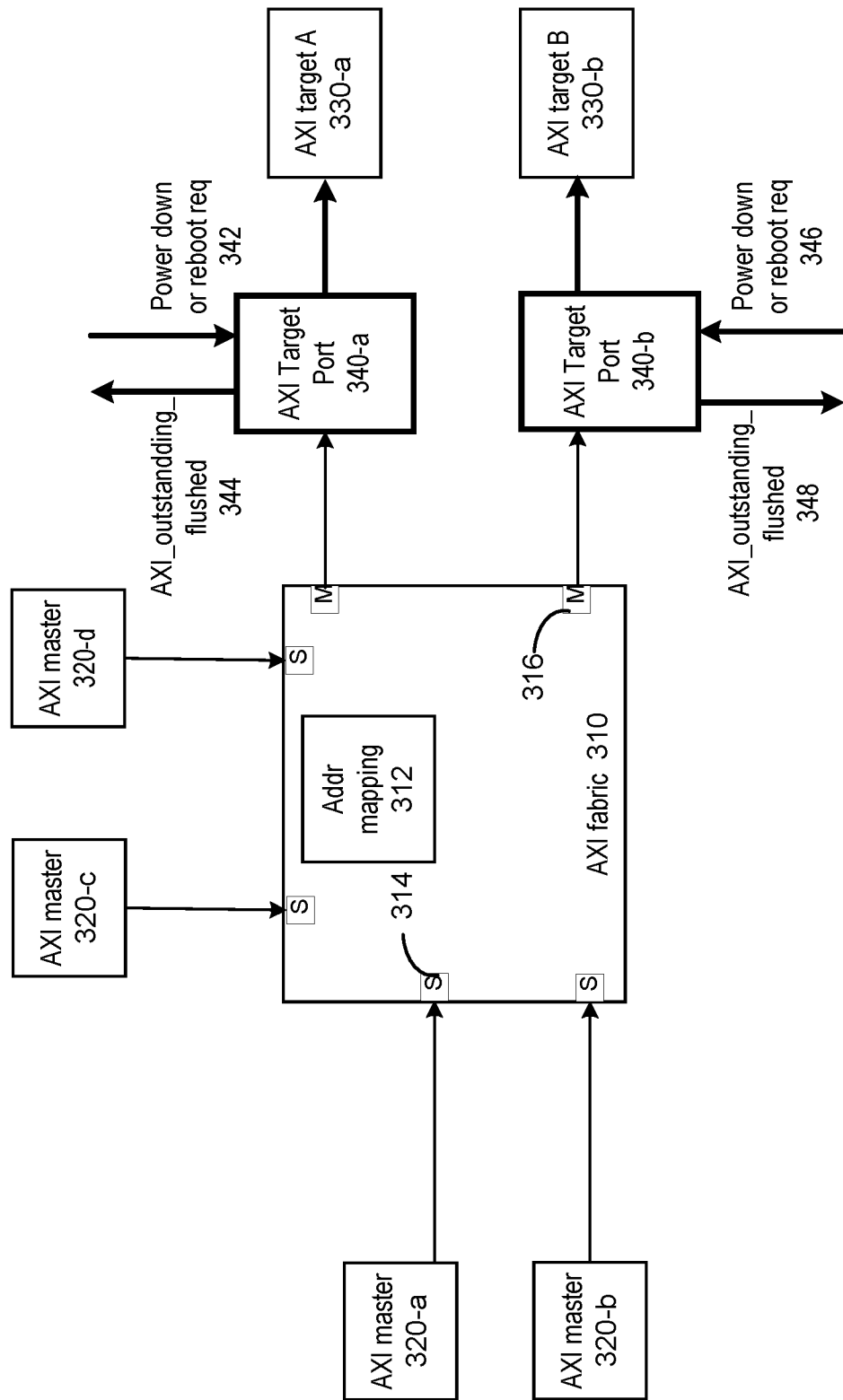
FIG. 3 illustrates an example of a system including multiple AXI master devices, multiple AXI target devices, and an AXI target port circuit between an AXI fabric and each respective target device according to certain embodiments.

FIG. 3 illustrates an example of a system 300 including multiple AXI master devices, multiple AXI target devices, and an additional AXI target port circuit between an AXI fabric 310 and each respective target device according to certain embodiments. As system 200, system 300 may also include multiple (e.g., four) AXI master devices 320-*a*, 320-*b*, 320-*c*, 320-*d*, and the like (collectively referred to as "AXI master devices 320"). System 300 may also include multiple (e.g., two) AXI target devices 330-*a*, 330-*b*, and the like (collectively referred to as "AXI target devices 330") connected to AXI master devices 320 through AXI fabric 310. AXI fabric 310 may include multiple target interfaces 314 for point-to-point connection with AXI master devices 320, multiple master interfaces 316 for point-to-point connection with AXI target devices 330, and a crossbar connecting master interfaces 316 and target interfaces 314. AXI fabric 310 may include an address mapping logic 312 configured to determine which master interface 316 is the target of each transaction by decoding the address of each AW or AR channel transaction from target interfaces 314.

In some circumstances, a target device, such as AXI target A (330-*a*), may need to be powered down or rebooted during operation of system 300. As shown in FIG. 3, according to certain embodiments, an AXI target port circuit may be added between each master interface 316 and a corresponding AXI target device. For example, an AXI target port circuit 340-*a* may be added between AXI fabric 310 and AXI target A (330-*a*) and an AXI target port circuit 340-*b* may be added between AXI fabric 310 and AXI target B (330-*b*). Because the AXI target port circuit is added at the target port after the address mapping logic, no top level routing wires for address mapping and handshaking between each master device and each target device as shown in FIG. 2 are needed.

The AXI target port circuit can be configured to receive a power-down or reboot request (e.g., 342 or 346) from software and gate the ready signals on the AXI channels connected to the corresponding target device to stop accepting new transactions while the target device performs the outstanding transactions before being powered down or rebooted. After the outstanding transactions are completed, the AXI target port circuit may release the gating of the ready signals to accept new transactions and respond to the new transactions with error messages. After the outstanding transactions have been completed, the AXI target port circuit may also send a signal (e.g., AXI_outstanding_flushed signal 344 or 348) to software indicating that the outstanding transactions have been completed and it is now safe to power down or reboot the target device, such that the software may safely power down or reboot the device. After the target device completes the reboot and is ready to accept new transactions, the power down or reboot request may be de-asserted, and the AXI target port circuit may stop generating error messages for incoming transactions and may switch back to the target device for generating ready signals and performing transactions targeting the target device again.

Figure 4:
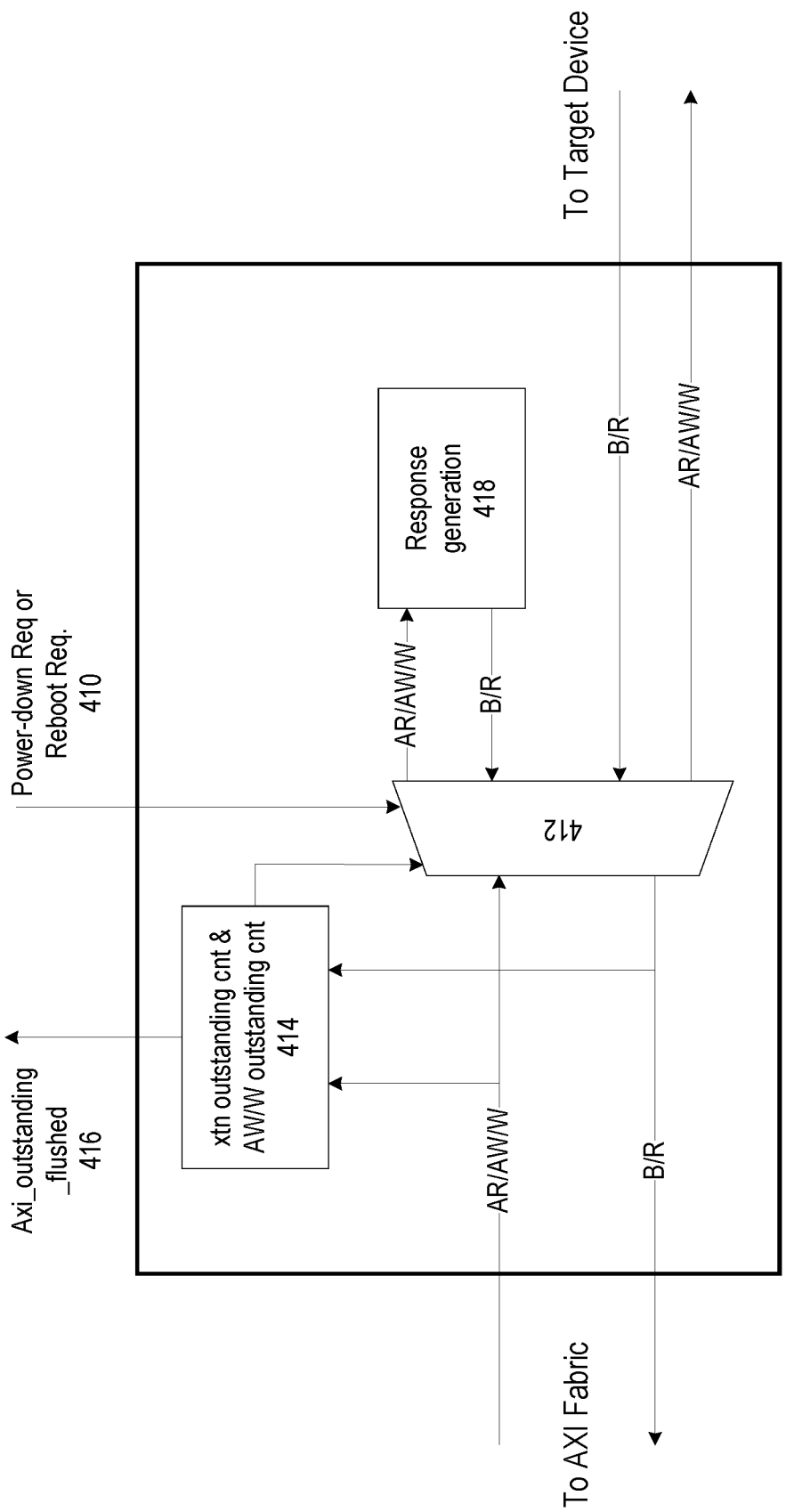
FIG. 4 illustrates an example of an AXI target port circuit according to certain embodiments.

FIG. 4 illustrates an example of an AXI target port circuit 400 according to certain embodiments. AXI target port circuit 400 may be a specific implementation of AXI target port circuit 340-*a* or 340-*b* described above with respect to FIG. 3. AXI target port circuit 400 may include a control logic 412, which may include a gate, a multiplexer, or a switching device. Control logic 412 may be configured to gate or release AXI ready signals, and direct the write address signals, write data signals, read address signals, read data signals, and write response signals to corresponding circuits (e.g., the associated target device or a response generation circuit) based on a request signal (e.g., a power-down request or reboot request signal 410) and the status of the outstanding transactions. For example, control logic 412 may gate an AWREADY signal that is generated by the target device and indicates that the target device is ready to sample the write address, such that the master device may not send the write address to the target device or the write address may not be accepted by the target device because the write address is only accepted when an AWVALID signal from the master device and the AWREADY signal from the target device are both valid. Similarly, control logic 412 may gate an ARREADY signal that is generated by the target device and indicates that the target device is ready to sample the read address, such that the master device may not send the read address to the target device or the read address may not be accepted by the target device because the read address is only accepted when an ARVALID signal from the master device and the ARREADY signal from the target device are both valid. In addition, control logic 412 may gate a WREADY signal that is generated by the target device and indicates that the target device is ready to sample the write data, such that the master device may not send the write data to the target device or the write data may not be accepted by the target device because the write data is only accepted when a WVALID signal from the master device and the WREADY signal from the target device are both valid.

AXI target port circuit 400 may include one or more counters 414, which may include, for example, one or more of a total outstanding transaction counter, a write address (AW) signal counter, a write data (W) signal counter, a counter indicating the difference between the number of outstanding write address transactions and the number of outstanding write data transactions, a total outstanding write transaction counter, and a total outstanding read transaction counter. Counters 414 may be used to determine the status of the outstanding transactions. For example, a total outstanding transaction counter may indicate whether there is any outstanding transaction to be performed. If the value of the total outstanding transaction counter is zero, all outstanding transactions have been completed, and an AXI_outstanding_flushed signal may be sent to software to indicate that it is now safe to power down or reboot the target device, such that the software may safely power down or reboot the device. A zero in the total outstanding transaction counter may also cause control logic 412 to release the gating on the ready signals such that new transactions may be accepted by AXI target port circuit 400.

In addition, AXI target port circuit 400 may include response generation circuit 418. A zero in the total outstanding transaction counter may also cause control logic 412 to transfer the incoming transactions from the AXI fabric to response generation circuit 418. Response generation circuit 418 may respond to the incoming transactions. For example, response generation circuit 418 may send ready signals to the master devices, and may respond to incoming transactions with error messages, or other default or pre-determined response messages (B).

When the target device completes the reboot and is ready to accept new transactions, the power-down request or reboot request signal 410 may be de-asserted, which may cause control logic 412 to transfer any incoming transactions to the target device, rather than to response generation circuit 418, such that the AXI target port circuit may stop generating error messages for incoming transactions and the target device can send ready signals and perform transactions targeting the target device.

In this way, the AXI ID ordering rules can be complied with by gating the AWREADY, ARREADY, and WREADY signals at each target port when the reboot or power-down request is received, and responses may be sent to the master devices to prevent the master devices from entering the hang state. No additional routing wires may be needed for the address mapping information and the handshake signals.

As described above, AXI protocol may allow the write address transaction and the write data transaction for a same write transaction to arrive at the target port at different cycles or phases on different channels. This may complicate the gating of the AWREADY, ARREADY, WREADY signals described above. For example, there might be cases where the write address transaction has been accepted by the target device but the write data transaction has not arrived at the target device. If both the AWREADY signal and the WREADY signal are gated as soon as the reboot or power-down request is received, the write data transaction may not get accepted when it arrives since WREADY is gated. As such, the outstanding write transaction may not be completed because no write data transaction is accepted. Same results may also occur when the write data transaction is ahead of the write address transaction and the write data transaction has been accepted but the write address transaction has not been accepted before the reboot or power-down request is received. In some circumstances where AXI protocol is used, write address transactions for multiple write transactions may have been accepted, but no write data transaction may be received for any of these transactions. Similarly, in some circumstances, a write data transaction can be multiple transactions ahead of the corresponding write address transaction, and write data transactions for multiple write transactions may have been accepted, but no write address transaction may have been received for any of these transactions.

According to certain embodiments, an outstanding AW/W counter indicating the difference between the number of outstanding write address transactions and the number of outstanding write data transactions may be used to determine whether the write data channel or the write address channel is ahead or not. For example, the outstanding AW/W counter may be increased by 1 when a write address transaction is received, and the outstanding AW/W counter may be decreased by 1 when a write data transaction is received. The ready signal for the channel that is ahead can be gated as soon as the reboot or power-down request is received, while the ready signal for the lagging channel may not be gated until the outstanding AW/W counter reaches 0. A zero in the outstanding AW/W counter may indicate that the lagging channel has caught up with the leading channel. This would allow outstanding transactions to get all the necessary addresses and data to complete. In some embodiments, two separate counters may be used, where one counter may be used to count the number of outstanding write address transactions and the other one may be used to count the number of outstanding write data transactions, where the difference between the values in the two counters may indicate which channel is ahead.

Figure 5:
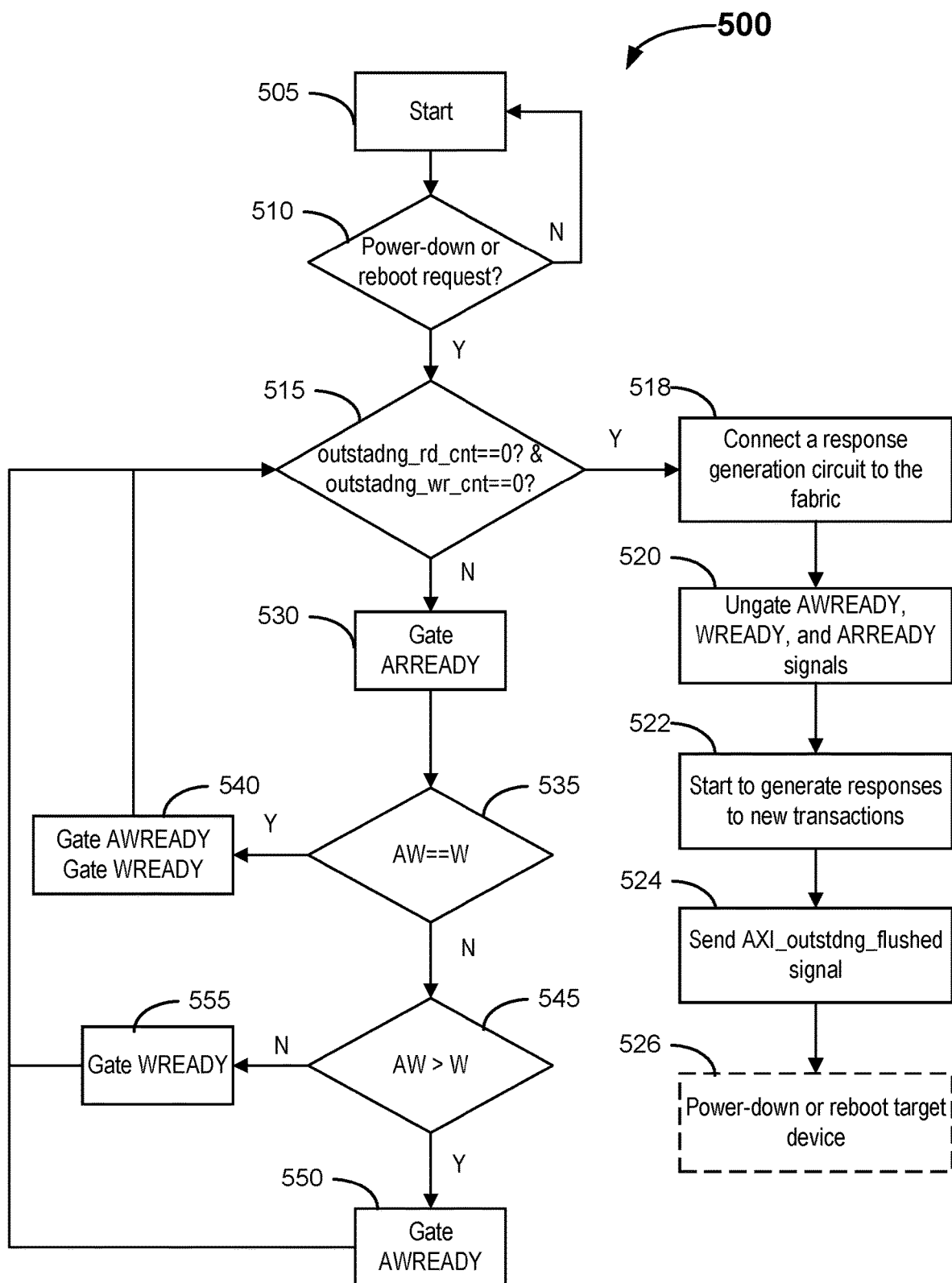
FIG. 5 is a simplified flow chart illustrating examples of operations of an AXI target port circuit according to certain embodiments.

FIG. 5 is a simplified flow chart 500 illustrating examples of operations of an AXI target port circuit according to certain embodiments. The operations show in FIG. 5 may be performed by, for example, system 300, AXI target port circuit 340-*a*, AXI target port circuit 340-*b*, or AXI target port circuit 400 described above. As described above, the target port circuit may be associated with a target device and may connect the target device to an AXI fabric.

At block 505, a target device connected to the target port circuit may be active, and the target port circuit may work in the normal function mode where the target device connected to the target port circuit may be connected to any master device through a control logic (e.g., control logic 412) of the target port circuit and the AXI fabric (e.g., AXI fabric 310). Thus, the target port circuit may transfer transaction signals between the target device and the AXI fabric, and the target device may perform transactions with any master device as if the target port circuit does not exist.

At block 510, the control logic may detect if a power-down or reboot request signal is sent to the target port circuit from software to start the power-down or reboot process for the target device associated with the target port circuit. If no power-down or reboot request signal is received, the target port circuit may continue to work in the normal function mode and connect the associated target device to the AXI fabric. If a power-down or reboot request signal is received, the control logic may proceed to block 515.

At block 515, the control logic may detect if there is any outstanding transaction based on the value in a counter. For example, the target port circuit may include an overall outstanding transaction counter that counts the total number of outstanding transactions, or may include an outstanding write transaction counter and an outstanding read transaction counter that count the total number of outstanding write transactions and the total number of outstanding read transactions, respectively. If the value in the overall outstanding transaction counter is zero or if the values of both the outstanding write transaction counter and the outstanding read transaction counter are zero, there is no outstanding transaction to be performed, and the control logic may perform the operations at blocks 518-524. Otherwise, the control logic may perform the operation at block 530.

At block 518, the control logic may disconnect the target device from the AXI fabric and connect a response generation circuit to the AXI fabric. At block 520, the control logic may stop gating all ready signals for the target device, including the AWREADY signal generated by the target device and indicating that the target device is ready to accept write address transactions, the WREADY signal generated by the target device and indicating that the target device is ready to accept write data transactions, and the ARREADY signal generated by the target device and indicating that the target device is ready to accept read address signals. At block 522, the control logic may transfer the incoming transactions to a response generation circuit (e.g., response generation circuit 418) of the target port circuit. The response generation circuit may start to handle incoming transactions by responding to the incoming transactions with error messages, or other default or pre-determined response messages, such that other devices or circuits in the system may continue to operate, rather than waiting for the responses in a hang state. At block 524, a signal (e.g., AXI_outstanding_flushed signal 416) indicating that all outstanding transactions have been completed and that it is safe to power down or reboot the target device may be sent by the target port circuit to the software, such that the software may safely power down or reboot the target device at block 526.

At block 530, the control logic may gate the ARREADY signal such that no new read transactions may be accepted by the target device or the target port circuit. The target port circuit may then determine at block 535 whether an outstanding AW/W counter has a value of zero or if the values of an outstanding write address counter and an outstanding write data counter are equal. As described above, the outstanding AW/W counter may count the difference between the number of outstanding write address transactions and the number of outstanding write data transactions, which may indicate whether the write data channel or the write address channel is ahead. For example, the outstanding AW/W counter may be increased (or decreased) by 1 when a write address transaction is received, and the outstanding AW/W counter may be decreased (or increased) by 1 when a write data transaction is received.

If the outstanding AW/W counter has a value zero or if the values of the outstanding write address counter and the outstanding write data counter are equal, the write address channel and the write data channel may be synchronized (i.e., there may be no lagging or delay between the two channels), the control logic may perform the operation at block 540, which may include gating both AWREADY signal and WREADY signal, and then go back to block 515 to check if all outstanding transactions have been completed.

If the value in the outstanding AW/W counter is not zero or if the values of the outstanding write address counter and the outstanding write data counter are different, there may be delay or lagging between the write address channel and the write data channel, and thus the target port circuit may go to block 545, where the target port circuit may determine which channel in the write address channel and the write data channel is ahead. For example, if the number of outstanding write address transactions is greater than the number of outstanding write data transactions (or the value in the outstanding AW/W counter is greater than zero or below zero), the write address channel may be ahead of the write data channel. On the other hand, if the number of outstanding write address transactions is fewer than the number of outstanding write data transactions (or the value in the outstanding AW/W counter is below than zero or greater than zero), the write address channel may be behind the write data channel.

If the target port circuit determines that the write address channel is ahead of the write data channel at block 545, the control logic may gate the AWREADY signal at block 550 such that no new write address transactions may be accepted by the target device or the target port circuit. If the target port circuit determines that the write address channel is behind the write data channel at block 545, the control logic may gate the WREADY signal at block 555 such that no new write data transactions may be accepted by the target device or the target port circuit. The target port circuit may then proceed to block 515, where it may determine whether all outstanding transactions have been completed.

Figure 6:
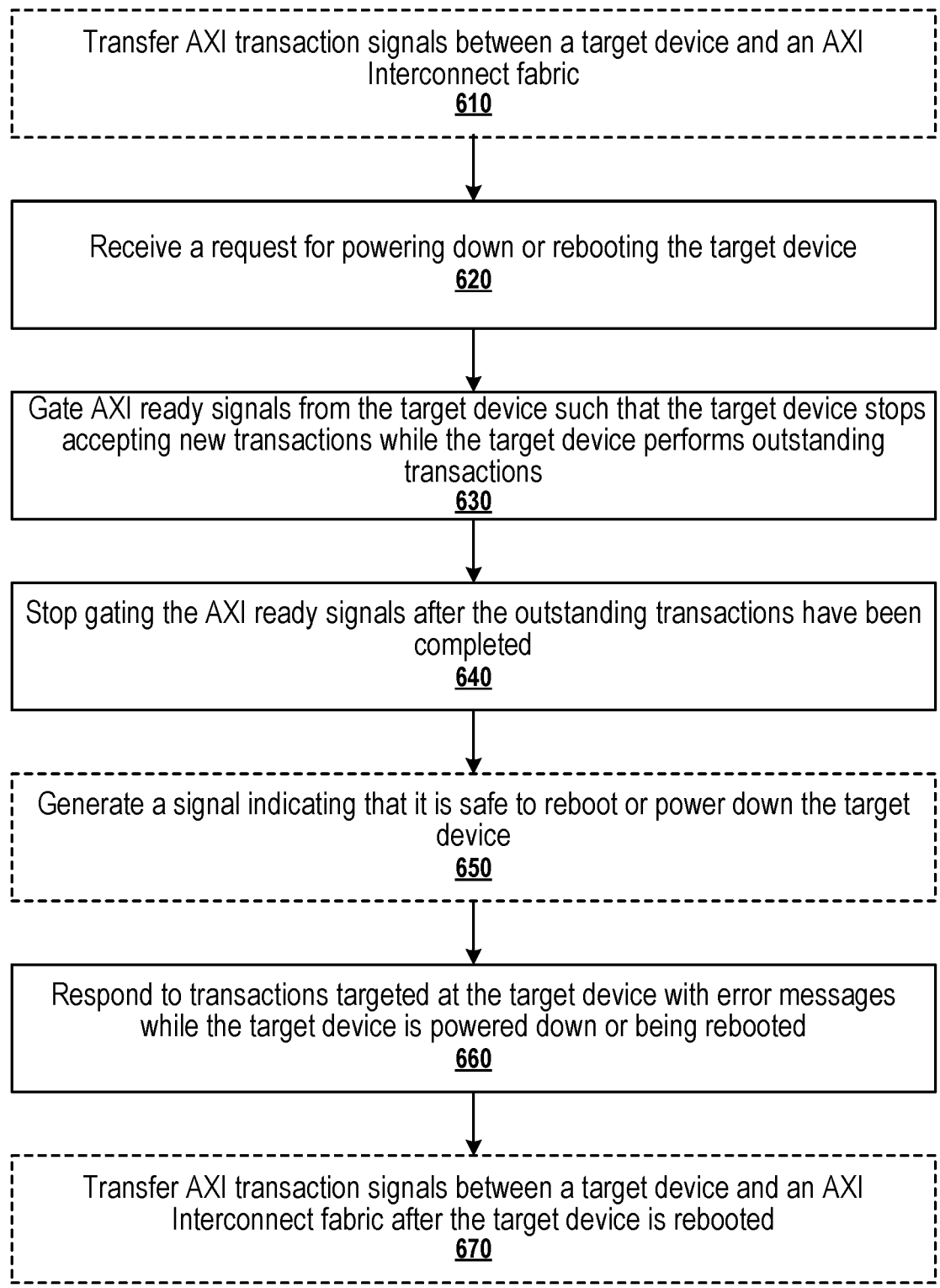
FIG. 6 illustrates an example of a method for powering down or rebooting a target device in a multi-device system while other devices of the multi-device system are active according to certain embodiments.

FIG. 6 illustrates an example of a method for powering down or rebooting a target device in a multi-device system while other devices of the multi-device system are active according to certain embodiments. The method illustrated in FIG. 6 may be implemented by, for example, system 300, AXI target port circuit 340-a, AXI target port circuit 340-b, or AXI target port circuit 400 described above.

At block 610, a target port circuit between a target device and an AXI interconnect fabric of the multi-device system may operate in a normal function mode and may be configured to transfer transaction signals between the target device and the AXI interconnect fabric. As described above, the multi-device system may include a set of master devices, a set of target devices, and a set of target port circuits. The AXI interconnect fabric may include target interfaces coupled to the set of master devices, and master interfaces coupled to the set of the target port circuits that each is coupled to a respective target device. The transaction signals may include any handshake signals and data transfer signals according to the AXI protocol, such as valid signals, ready signals, write address signals, write data signals, write response signals, read address signals, read data signals, and the like.

At block 620, the target port circuit may receive a request for powering down or rebooting the target device. It may be desirable that other devices in the multi-device system are active while the target device is powered down or is being rebooted. It may also be desirable for the target device to finish all outstanding transactions that have been accepted before the power-down or reboot. It may further be desirable to respond to any transaction request from an active master device when the target device is powered down or is being rebooted, such that the master device may continue to operate rather than entering a hang state.

At block 630, the target port circuit may gate AXI ready signals from the target device such that the target device stops accepting new transactions while the target device performs outstanding transactions received before receiving the request for powering down or rebooting the target device. In some embodiments, the target port circuit may include a counter configured to count the total number of incomplete transactions for the target device to determine if all outstanding transactions have been completed. For example, a zero value in the counter may indicate that the outstanding transactions have been completed. If the value in the counter is not zero, the target port circuit may gate at least one of the ARREADY signal, AWREADY signal, or WREADY signal from the target device. When an AXI ready signal is gated, the target device may not accept new transactions on the corresponding AXI channel. In some embodiments, the target port circuit may count the difference between the number of outstanding write address transactions and the number of outstanding write data transactions to determine which one of the write address channel and the write data channel is lagging or is ahead of the other channel, and then gate the AWREADY signal and WREADY signal accordingly. For example, the target port circuit may gate the ready signal for the write address channel (i.e., AWREADY signal) when the counter indicates that the number of outstanding write address transactions is greater than the number of outstanding write data transactions (which indicates that the write data channel is lagging or behind). The target port circuit may gate the ready signal for the write data channel (i.e., WREADY signal) when the counter indicates that the number of outstanding write address transactions is less than the number of outstanding write data transactions (which indicates that the write address channel is lagging or behind). The target port circuit may gate both the ready signal for the write address channel and the ready signal for the write data channel when the counter indicates that the number of outstanding write address transactions is equal to the number of outstanding write data transactions.

At block 640, after the outstanding transactions have been completed, the target port circuit may stop gating the AXI ready signals. The target port circuit may disconnect the target device from the AXI interconnect fabric and may connect a response generation circuit to the AXI interconnect fabric. At block 650, the target port circuit may generate a signal indicating that it is safe to reboot or power down the target device, such that the target device may be safely powered down or rebooted.

At block 660, the target port circuit may respond to incoming transactions (e.g., with error messages) when the target device is powered down or is being rebooted. In some embodiments, the response generation circuit may be configured to generate a pre-determined message, such as an error message or a default message, in response to an incoming transaction. In some embodiments, the target port circuit may include a control logic configurable to transfer transaction signals between the response generation circuit and the AXI interconnect fabric when the target device is powered down or being rebooted.

At block 670, after the target device is rebooted, the target port circuit, more specifically, the control logic, may be configured to work in the normal function mode to transfer AXI transaction signals between the target device and the AXI Interconnect fabric.

Even though FIG. 6 describes the example method as sequential operations, some of the operations may be performed in parallel or concurrently. Some operations may be performed in a different order. For example, the operations at blocks 640 and 650 may be performed in parallel or in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

As described above, in some embodiments, a master port circuit may be added between the interconnect fabric and a master device. The master port circuit may be similar to the target port circuit, such as AXI target port circuit 400 described above with respect to FIG. 4, and may include a control logic and one or more counters (but not the response generation circuit). When the master device is active, the control logic may transfer signals between the master device and the interconnect fabric such that the interconnect fabric and the master device may communicate as if the master port circuit was not added. When a request to reboot or power-down the master device is received, the control logic may gate the appropriate ready signals (or other back-pressure signals) to the master device and track outstanding transactions associated with the master device, such that the outstanding transactions can be performed before the reboot or power-down and no new transactions may be initiated before the outstanding transactions are completed. In some embodiments, a counter may be used to count the number of outstanding transactions. In some embodiments, a counter may be used to count the difference between the number of outstanding write address transactions and the number of outstanding write data transactions, such that the ready signals on different channels may be gated at different times to ensure that transactions associated with any write address transactions and any write data transactions sent before the request to reboot or power-down the master device is received are completed before rebooting or powering down the master device. After all outstanding transactions have been completed, the master device may be powered down or rebooted and may not initiate new transactions.

Figure 7:
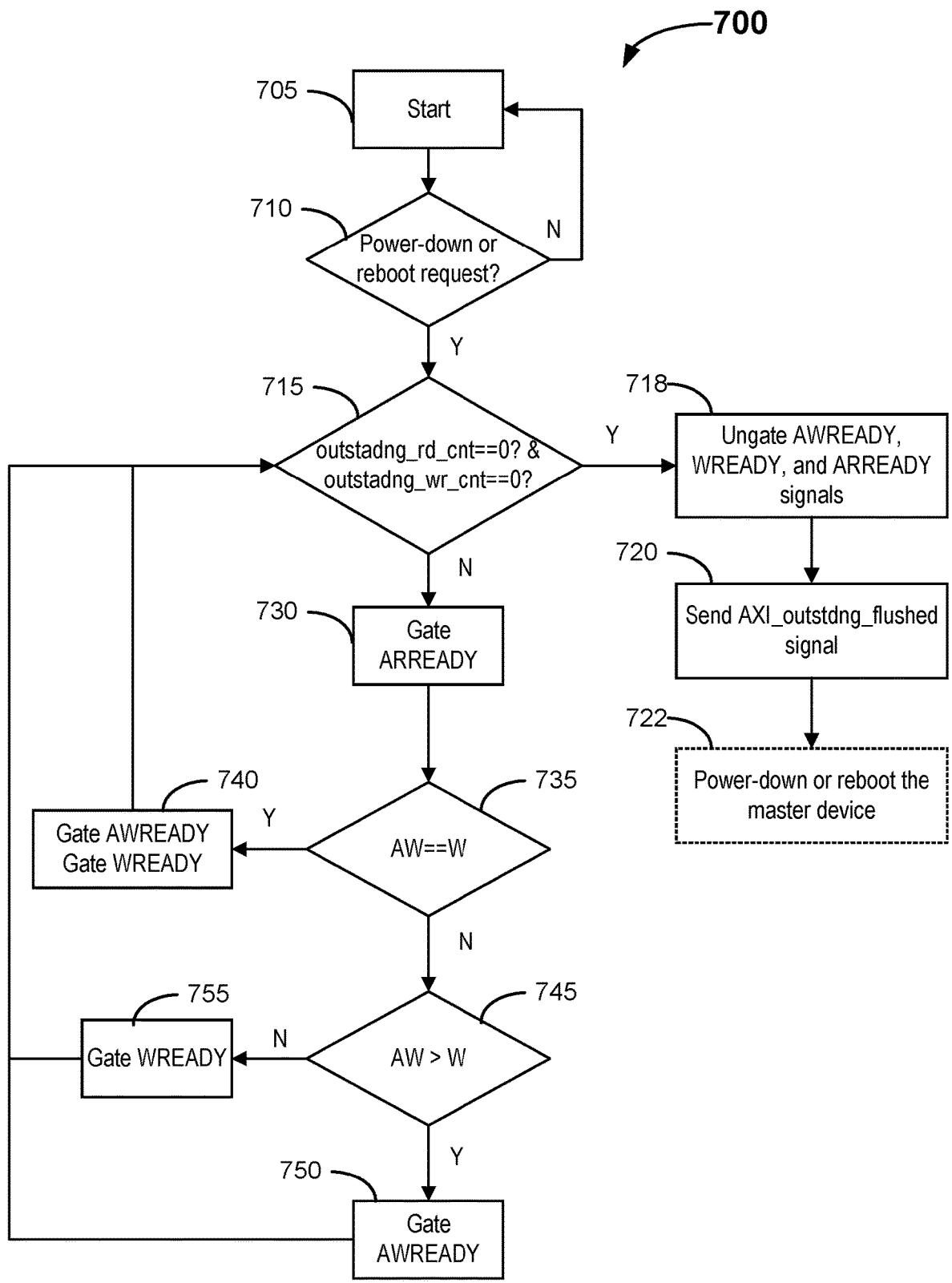
FIG. 7 is a simplified flow chart illustrating examples of operations of an AXI master port circuit according to certain embodiments.

FIG. 7 is a simplified flow chart 700 illustrating examples of operations of an AXI master port circuit according to certain embodiments. As described above, the master port circuit may be associated with a mater device and may connect the master device to an AXI fabric.

At block 705, a master device connected to the master port circuit may be active, and the master port circuit may work in the normal function mode where the master device connected to the master port circuit may be connected to any target device through a control logic of the master port circuit and the AXI fabric (e.g., AXI fabric 310). Thus, the master port circuit may transfer transaction signals between the master device and the AXI fabric, and the master device may perform transactions with any target device as if the master port circuit does not exist.

At block 710, the control logic may detect if a power-down or reboot request signal is sent to the master port circuit from software to start the power-down or reboot process for the master device associated with the master port circuit. If no power-down or reboot request signal is received, the master port circuit may continue to work in the normal function mode and connect the associated master device to the AXI fabric. If a power-down or reboot request signal is received, the control logic may proceed to perform the operation at block 715.

At block 715, the control logic may detect if there is any outstanding transaction based on the value in a counter. For example, the master port circuit may include an overall outstanding transaction counter that counts the total number of outstanding transactions associated with the master device, or may include an outstanding write transaction counter and an outstanding read transaction counter that count the total number of outstanding write transactions and the total number of outstanding read transactions, respectively. If the value in the overall outstanding transaction counter is zero or if the values of both the outstanding write transaction counter and the outstanding read transaction counter are zero, there is no outstanding transaction to be performed, and the control logic may perform the operations at blocks 718-722. Otherwise, the control logic may perform the operation at block 730.

At block 718, the control logic may stop gating all ready signals for the master device, including the AWREADY signal, the WREADY signal, and the ARREADY signal to the master device. In some embodiments, the control logic may disconnect the master device from the AXI fabric. At block 720, the control logic may send a signal indicating that all outstanding transactions have been completed and that it is safe to power down or reboot the master device to the software, such that the software may safely power down or reboot the master device at block 722.

At block 730, the control logic may gate the ARREADY signal to the master device such that no new read transactions may be sent to the AXI fabric. The master port circuit may then determine at block 735 whether an outstanding AW/W counter has a value of zero or if the values of an outstanding write address counter and an outstanding write data counter are equal. As described above, the outstanding AW/W counter may count the difference between the number of outstanding write address transactions and the number of outstanding write data transactions, which may indicate whether the write data channel or the write address channel is ahead. For example, the outstanding AW/W counter may be increased (or decreased) by 1 when a write address transaction is sent by the master device, and the outstanding AW/W counter may be decreased (or increased) by 1 when a write data transaction is sent by the master device.

If the outstanding AW/W counter has a value zero or if the values of the outstanding write address counter and the outstanding write data counter are equal, the write address channel and the write data channel may be synchronized (i.e., there may be no lagging or delay between the two channels), the control logic may perform the operation at block 740, which may include gating both AWREADY signal and WREADY signal to the master device, and then perform the operation at block 715 to check if all outstanding transactions have been completed.

If the value in the outstanding AW/W counter is not zero or if the values of the outstanding write address counter and the outstanding write data counter are different, there may be delay or lagging between the write address channel and the write data channel, and thus the master port circuit may perform the operation at block 745, where the master port circuit may determine which channel in the write address channel and the write data channel is ahead. For example, if the number of outstanding write address transactions is greater than the number of outstanding write data transactions (or the value in the outstanding AW/W counter is greater than zero or below zero), the write address channel may be ahead of the write data channel. On the other hand, if the number of outstanding write address transactions is fewer than the number of outstanding write data transactions (or the value in the outstanding AW/W counter is below than zero or greater than zero), the write address channel may be behind the write data channel.

If the master port circuit determines that the write address channel is ahead of the write data channel at block 745, the control logic may gate the AWREADY signal to the master device at block 750 such that no new write address transactions may be sent to the AXI fabric by the master device. If the master port circuit determines that the write address channel is behind the write data channel at block 745, the control logic may gate the WREADY signal to the master device at block 755 such that no new write data transactions may be sent to the AXI fabric by the master device. The master port circuit may then perform the operation at block 715, where it may determine whether all outstanding transactions have been completed.

Figure 8:
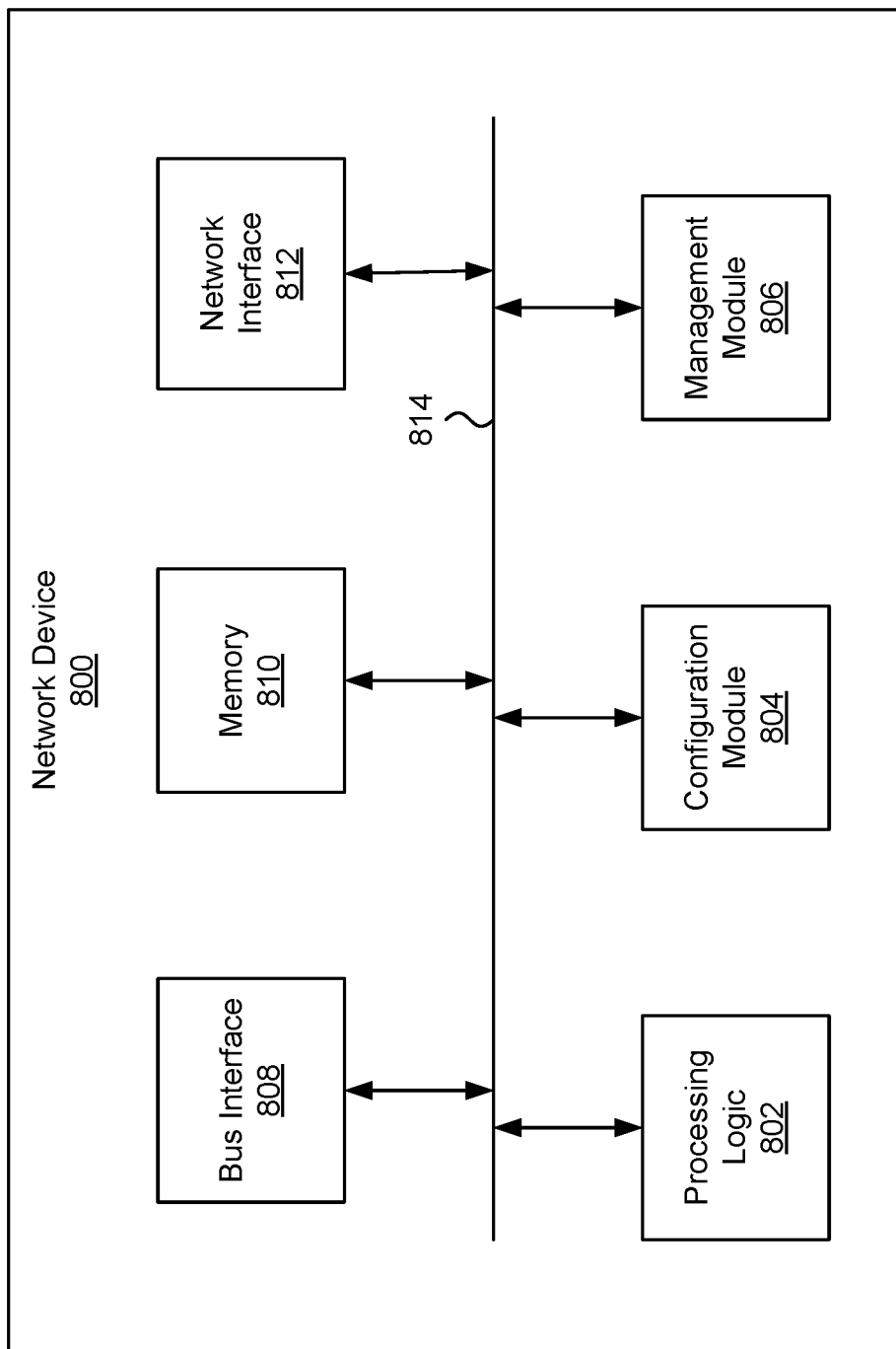
FIG. 8 illustrates an example of a network device according to certain aspects of the disclosure.

FIG. 8 illustrates an example of a network device 800. Functionality and/or several components of the network device 800 may be used without limitation with other embodiments disclosed elsewhere in this disclosure, without limitations. A network device 800 may facilitate processing of packets and/or forwarding of packets from the network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 800 may be the recipient and/or generator of packets. In some implementations, the network device 800 may modify the contents of the packet before forwarding the packet to another device. The network device 800 may be a peripheral device coupled to another computer device, a switch, a router or any other suitable device enabled for receiving and forwarding packets.

In one example, the network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The network device 800 may include additional modules, not illustrated here, such as components discussed with respect to the nodes disclosed in FIG. 9. In some implementations, the network device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the network device 800, while in other cases some or all of the memory may be external to the network device 800. The memory 810 may store an operating system comprising executable instructions that, when executed by the processing logic 802, provides the execution environment for executing instructions providing networking functionality for the network device 800. The memory may also store and maintain several data structures and routing tables for facilitating the functionality of the network device 800.

In some implementations, the configuration module 804 may include one or more configuration registers. Configuration registers may control the operations of the network device 800. In some implementations, one or more bits in the configuration register can represent certain capabilities of the network device 800. Configuration registers may be programmed by instructions executing in the processing logic 802, and/or by an external entity, such as a host device, an operating system executing on a host device, and/or a remote device. The configuration module 804 may further include hardware and/or software that control the operations of the network device 800.

In some implementations, the management module 806 may be configured to manage different components of the network device 800. In some cases, the management module 806 may configure one or more bits in one or more configuration registers at power up, to enable or disable certain capabilities of the network device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the network device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 902.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 800 may include multiple network interface modules, each configured to communicate with a different network. For example, in these implementations, the network device 800 may include a network interface module for communicating with a wired Ethernet network, a wireless 902.11 network, a cellular network, an Infiniband network, etc.

The various components and modules of the network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
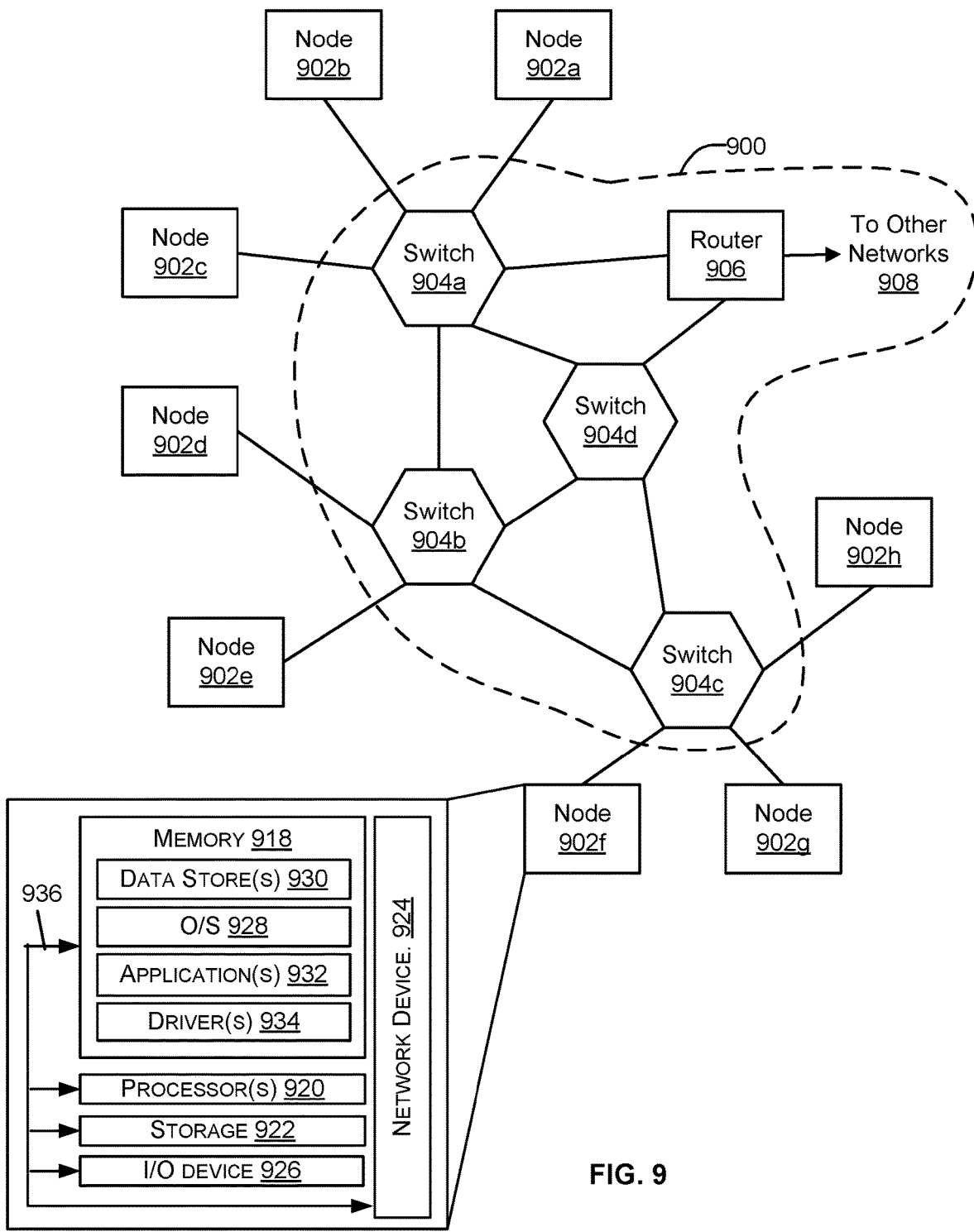
FIG. 9 illustrates an example architecture for features and systems described herein that includes one or more service provider computers and/or a user device connected via one or more networks according to certain aspects of the disclosure.

FIG. 9 illustrates a network 900, illustrating various different types of network devices 800 of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900. The network device(s) 924 of FIG. 9 may include similar components discussed with reference to the network device 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit comprising:
   a first interface coupled with a target device; and
   a second interface coupled with an interconnect fabric;
   a controller coupled between the first interface and the second interface and configured to:
      receive an indication that the target device is to undergo a power down operation or a rebooting operation; and
      based on receiving the indication, and that there is an outstanding transaction to be performed by the target device:
         prevent the target device from accepting, via the first interface, a new transaction from the interconnect fabric; and
         transmit, via the second interface to the interconnect fabric, a response to the new transaction.

2. The integrated circuit of claim 1, wherein the controller is configured to receive, from the target device and via the first interface, a first signal that indicates that the target device is ready to sample an address or data of the new transaction; and
   wherein the controller is configured to prevent the target device from accepting the new transaction based on preventing the first signal from reaching the interconnect fabric via the second interface.

3. The integrated circuit of claim 2, wherein the new transaction comprises a new read transaction; and
   wherein the controller is configured to prevent the target device from accepting the new read transaction based on determining that there is at least one outstanding transaction to be performed by the target device.

4. The integrated circuit of claim 3, wherein the first signal indicates that the target device is ready to sample an address of the new read transaction.

5. The integrated circuit of claim 2, wherein the new transaction comprises a new write address transaction or a new write data transaction; and
   wherein the controller is configured to prevent the target device from accepting the new write address transaction or the new write data transaction from the interconnect fabric based on a number of outstanding write address transactions and a number of outstanding write data transactions to be performed by the target device.

6. The integrated circuit of claim 5, wherein the controller is configured to prevent the target device from accepting the new write address transaction and the new write data transaction from the interconnect fabric based on the number of outstanding write address transactions and the number of outstanding write data transactions being equal.

7. The integrated circuit of claim 5, wherein the controller is configured to prevent the target device from accepting the new write address transaction based on the number of outstanding write address transactions exceeding the number of outstanding write data transactions.

8. The integrated circuit of claim 1, wherein the indication is a first indication;
   wherein the controller is further configured to:
   receive a second indication that the target device is active after the power down operation or the rebooting operation complete; and
   based on receiving the second indication, allow the target device to receive the new transaction or another new transaction.

9. The integrated circuit of claim 1, wherein the controller is configured to prevent the target device from accepting the new transaction based on preventing a sender device of the new transaction from sending a second signal required by the target device to accept the new transaction.

10. The integrated circuit of claim 9, wherein the second signal comprises a valid signal.

11. The integrated circuit of claim 1, wherein the controller is configured to prevent the target device from accepting the new transaction based on preventing a sender device of the new transaction from sending an address or data of the new transaction over the interconnect fabric.

12. The integrated circuit of claim 1, wherein the response comprises an error message, or a message to prevent a sender device of the new transaction from hanging.

13. The integrated circuit of claim 1, wherein the controller is configured to transmit the response to the interconnect fabric based on determining that the target device completes the outstanding transaction.

14. The integrated circuit of claim 1, wherein the indication is a first indication;
   wherein the controller is further configured to:
   receive a second indication that the target device is active after the power down operation or the rebooting operation complete; and
   based on receiving the second indication, stop transmitting the response.

15. The integrated circuit of claim 1, wherein the indication is a first indication;

wherein the controller is further configured to, based on determining that the target device completes the outstanding transaction, transmit a second indication to indicate that the target device is ready for the power down operation or the rebooting operation.

16. The integrated circuit of claim 1, wherein the interconnect fabric comprises an advanced extensible interface (AXI) interconnect fabric; and wherein the controller is configured to prevent the target device from accepting the new transaction based on gating at least one of: an AXI read address ready (ARREADY) signal, an AXI write address ready (AWREADY) signal, or an AXI write data ready (WREADY) signal.

17. A method, comprising:

receiving an indication that a target device is to undergo a power down operation or a rebooting operation; and based on receiving the indication, and that there is an outstanding transaction to be performed by the target device:

preventing the target device from accepting, from an interconnect fabric and via a first interface, a new transaction; and transmitting, via a second interface to the interconnect fabric, a response to the new transaction.

18. The method of claim 17, further comprising:

receiving, from the target device and via the first interface, a signal that indicates that the target device is ready to sample an address or data of the new transaction; and preventing the signal from reaching the interconnect fabric via the second interface.

19. The method of claim 17, wherein the new transaction comprises a new write address transaction or a new write data transaction; and wherein the method further comprises: preventing the target device from accepting the new write address transaction or the new write data transaction from the interconnect fabric based on a number of outstanding write address transactions and a number of outstanding write data transactions to be performed by the target device.

* * * * *